United States Patent
Eglin et al.

(10) Patent No.: US 8,583,295 B2
(45) Date of Patent: Nov. 12, 2013

(54) METHOD OF CONTROLLING AND REGULATING THE DEFLECTION ANGLE OF A TAILPLANE IN A HYBRID HELICOPTER

(75) Inventors: Paul Eglin, Roquefort-La Bedoule (FR); Nicolas Queiras, Les Pennes Mirabeau (FR); André Barraco, Cachan (FR); Francois Malburet, Coudoux (FR)

(73) Assignee: Eurocopter, Marignane Cedex (FR)

( * ) Notice: Subject to any disclaimer, the term of this patent is extended or adjusted under 35 U.S.C. 154(b) by 397 days.

(21) Appl. No.: 13/088,493

(22) Filed: Apr. 18, 2011

(65) Prior Publication Data

US 2012/0153072 A1    Jun. 21, 2012

(30) Foreign Application Priority Data

Apr. 27, 2010    (FR) ...................................... 10 01789

(51) Int. Cl.
    *B64C 27/57*    (2006.01)
(52) U.S. Cl.
    USPC .................................. 701/4; 244/17.13; 244/6
(58) Field of Classification Search
    USPC ................. 244/6, 8, 12.3, 12.5, 17.11, 17.13, 244/17.19, 89; 701/3, 4
    See application file for complete search history.

(56) References Cited

U.S. PATENT DOCUMENTS

| | | | | |
|---|---|---|---|---|
| 2,941,792 A | * | 6/1960 | Stutz | 73/514.37 |
| 3,385,537 A | * | 5/1968 | Lichten et al. | 244/6 |
| 3,799,695 A | | 3/1974 | Yamakawa | |
| 4,304,375 A | * | 12/1981 | Builta et al. | 244/17.13 |
| 4,730,795 A | * | 3/1988 | David | 244/6 |
| 6,123,291 A | * | 9/2000 | Dequin et al. | 244/17.13 |
| 6,513,752 B2 | * | 2/2003 | Carter, Jr. | 244/8 |
| 7,461,819 B2 | * | 12/2008 | Eglin | 244/195 |
| 8,052,094 B2 | * | 11/2011 | Roesch | 244/177 |
| 8,070,089 B2 | * | 12/2011 | Ferrier | 244/6 |

(Continued)

FOREIGN PATENT DOCUMENTS

| | | |
|---|---|---|
| CN | 101559832 A | 10/2009 |
| EP | 2105378 A1 | 9/2009 |
| FR | 2916420 A1 | 11/2008 |
| WO | 2008142256 A1 | 11/2008 |

OTHER PUBLICATIONS

Search Report and Written Opinion; Application No. FR 1001789; dated Dec. 7, 2010.

(Continued)

*Primary Examiner* — Benjamin P Lee
(74) *Attorney, Agent, or Firm* — Brooks Kushman P.C.

(57) ABSTRACT

A method of controlling and regulating a rotorcraft presenting a speed of advance that is high and stabilized, the rotorcraft including at least a main lift rotor (10), at least one variable pitch propulsion propeller (6), and at least one power plant for driving the main rotor(s) (10) and at least one propeller (6), said method consisting in using a first loop for regulating pitch or attitude, and a second loop for regulating speed by means of a control over the mean pitch of the propulsion propeller(s) (6), wherein the method further consists in controlling the deflection angle of a horizontal tailplane (30, 25, 35) by using a third loop for controlling and regulating said deflection angle of the horizontal tailplane (30, 25, 35) in order to minimize the total power consumed by the main rotor (10) and the propulsive propeller(s) (6), for a given speed and attitude.

12 Claims, 2 Drawing Sheets

(56) References Cited

U.S. PATENT DOCUMENTS

| | | | |
|---|---|---|---|
| 8,113,460 B2* | 2/2012 | Roesch | 244/6 |
| 8,170,728 B2* | 5/2012 | Roesch | 701/3 |
| 8,181,901 B2* | 5/2012 | Roesch | 244/6 |
| 8,240,617 B2* | 8/2012 | Biest et al. | 244/223 |
| 8,336,808 B2* | 12/2012 | Challis | 244/17.19 |
| 2008/0294305 A1* | 11/2008 | Roesch | 701/3 |
| 2009/0321554 A1* | 12/2009 | Roesch | 244/6 |
| 2010/0065677 A1* | 3/2010 | Ferrier | 244/6 |
| 2010/0219286 A1* | 9/2010 | Roesch | 244/6 |
| 2010/0224720 A1* | 9/2010 | Roesch | 244/12.3 |
| 2010/0243792 A1* | 9/2010 | Queiras et al. | 244/6 |
| 2011/0272519 A1* | 11/2011 | Challis | 244/6 |
| 2012/0018570 A1* | 1/2012 | Borie et al. | 244/17.13 |

OTHER PUBLICATIONS

Chinese Search Report Dated Aug. 1, 2013, Application No. 201110112899.2, Applicant Eurocopter, 5 pages.

* cited by examiner

METHOD OF CONTROLLING AND REGULATING THE DEFLECTION ANGLE OF A TAILPLANE IN A HYBRID HELICOPTER

CROSS REFERENCE TO RELATED APPLICATIONS

This application claims the benefit of FR 10 01789 filed on Apr. 27, 2010, the disclosure of which is incorporated in its entirety by reference herein.

BACKGROUND OF THE INVENTION (1) Field of the Invention

The present invention relates to the general technical field of automatic or semi-automatic flight control systems, and more particularly to a method of controlling and regulating the deflection angle of a moving tailplane of a particular type of rotorcraft, specifically a hybrid helicopter.

More particularly, the present invention relates to a rotorcraft and to its system for controlling a movable tailplane, with the deflection angle of the tailplane being determined as a function of specific parameters in stabilized flight at a high cruising speed.

(2) Description of Related Art

The term "rotorcraft" is used to designate an aircraft in which lift is provided in full or in part by one (or more) large-diameter propeller(s) having an axis that is substantially vertical, and referred to as a "rotor" or indeed as a "rotary wing".

In the general category of rotorcraft various distinct types may be distinguished, however the hybrid helicopter in accordance with the invention includes, in addition to at least one main rotor, at least one propulsive propeller, preferably two variable-pitch propulsive propellers, forming parts of thrust units located on the left and right sides of the hybrid helicopter.

In a conventional helicopter, at least one main rotor under appropriate drive serves to provide both lift and propulsion. A helicopter is capable of hovering and of remaining stationary at a point in three dimensions, is capable of taking off or landing vertically, and can move in any direction (forwards and backwards, sideways, up and down).

Regulation of the power driving a conventional helicopter (not having any propeller thruster(s)) generally comprises a control member or module that adapts the power delivered by the power plant to the power required by the moving assemblies (rotor(s) and accessories), in such a manner as to maintain the speed of rotation of the main rotor(s) and of the power transmission system at a setpoint value.

On an aircraft propelled by one or more propellers of variable pitch, power regulation generally includes a regulator member and/or module (generally of the hydromechanical type) that adapts the pitch of the propulsive propeller so as to consume all of the available power that results from the pilot operating a throttle (or thrust) control member or lever.

Those two types of regulation cannot be juxtaposed in order to regulate the power of a rotorcraft fitted with propeller thruster(s), since the regulation techniques are in opposition. The member for adapting power during conventional regulation of a helicopter would counter transient speed variation in the power transmission system that would result from causing thrust delivered by the propeller(s) to vary.

Furthermore, for a rotorcraft fitted with propeller thruster(s), regulation of said propeller thruster(s) whereby the pilot varies propulsion propeller pitch directly might give rise to propeller damage as a result of sudden variations in the driving torque delivered thereto.

In a hybrid helicopter having variable pitch propellers, the pilot must simultaneously limit the variation of the collective pitch in an upward direction and consequently the variation in the power transmitted to the rotor(s) by the power plant via the transmission members in order to avoid exceeding the mechanical or thermal limits of said elements, and also, and for the same reasons, limit the thrust control applied to the propellers, i.e. the propeller pitch control, as explained above.

Furthermore, since the power plant of a hybrid helicopter is constituted by one or more turbine engines, the speeds of rotation of the outlet from the turbine engine(s), of the propeller(s), of the rotor(s), and of the mechanical system interconnecting them are mutually proportional, with the proportionality ratio being constant regardless of the flight configuration of the hybrid helicopter under normal conditions of operation of the integrated drive train.

It can thus be understood that if a hybrid helicopter is fitted with a single turbine engine, that engine rotates the rotor(s) and the propeller(s) via the mechanical interconnection system. However, if two or more turbine engines are fitted to the hybrid helicopter, then the rotor(s) and the propeller(s) are driven in rotation via the mechanical interconnection system by said turbine engines.

In other words, the drive train operates without any option for varying the ratios of the speeds of rotation between the turbine engine(s), the propeller(s), the rotor(s), and the mechanical interconnection system.

Consequently, the rotor(s) is/are advantageously always driven in rotation by the turbine engine(s) in normal flight configurations, and it/they always develop(s) lift, whatever the configuration of the aircraft.

More precisely, the rotor(s) is/are thus designed to provide the hybrid helicopter with all of its lift during stages of take-off, landing, and vertical flight, and part of its lift during cruising flight, with an auxiliary wing then contributing part of the lift for supporting said hybrid helicopter.

Thus, the rotor(s) provide(s) some of the lift of a hybrid helicopter in cruising flight together optionally with a small contribution to the propulsion or traction forces (in a helicopter), but without any contribution to drag. These operating conditions thus lead to a reduced amount of power dedicated to providing traction being delivered to the rotor(s). A small contribution to the propulsion forces is obtained by a small amount of inclination of the rotor disk(s) towards the front of the aircraft. This process degrades the lift-to-drag ratio of the rotor(s) very little and consequently it is more advantageous in terms of power balance than is a request for additional thrust to be exerted by the propeller(s).

Advantageously, the wing comprises two half-wings, each half-wing being on a respective side of the fuselage. The half-wings may together make up a high wing, in which case they preferably present a negative dihedral angle. Nevertheless, they may also constitute either a low wing, preferably with a positive dihedral angle, or indeed an intermediate wing with any dihedral angle. Depending on the variant, the plane shape of these half-wings may correspond to rectangular half-wings, tapering half-wings, forwardly or rearwardly swept wings, etc.

Below, reference is made to a movable aircraft tailplane or motor-driven tailplane, meaning that the deflection angle of said tailplane may take different values.

Furthermore, the term "aircraft" is used quite generically for whatever kind of aircraft constitutes the topic under discussion.

In an "airplane" configuration, the tailplane is the elevator control of the aircraft. It is a member for directing controlling pitch and vertical speed of the aircraft.

In a "helicopter" configuration, the tailplane of the aircraft is usually stationary. A tailplane with a variable deflection angle on a helicopter may be used to counter the "attitude hump" phenomenon or to fly with a level attitude in forward flight so as to diminish drag or so as to diminish the nose-up attitude when the center of gravity of the helicopter is offset a long way towards the rear. Nevertheless, as from a certain speed of advance, a conventional helicopter cannot retain a level attitude over its entire centering range (i.e. the range over which the center of gravity of the aircraft may vary) since the bending moment exerted on the rotor mast, commonly referred to as the "mast moment", would become too great. The benefit of a tailplane with a variable deflection angle is consequently obtained at speeds of advance that are low or moderate. The above applies a priori to a tailplane that is stationary with or without flaps.

For example, document FR 2 916 420 discloses a rotorcraft having a motor-driven tailplane with motor-driven elevation control surfaces for conserving a zero mast moment in forward flight. This makes it possible to reduce forces on various mechanical parts.

A zero mast moment corresponds to a particular operating point of the aircraft and consequently allows for only very limited optimization of the power balance. Furthermore, in a certain number of flight configurations, it is not possible to conserve a zero mast moment.

In addition, a configuration that minimizes the mast moment in cruising flight is not necessarily a configuration that minimizes the power required.

SUMMARY OF THE INVENTION

The object of the present invention is to propose a novel hybrid helicopter type rotorcraft in which the power balance is optimized, and to do so at various different high and stabilized speeds of advance, independently of the mast moment of the rotor.

Consequently, the object of the present invention is to propose a novel method of controlling and regulating the deflection angle of a motor-driven horizontal tailplane of a rotorcraft of the hybrid helicopter type in order to optimize the power balance.

Another object of the present invention seeks consequently to propose a novel autopilot system that incorporates control and regulation functions for determining and modifying the angular position of a tailplane of a rotorcraft of the hybrid helicopter type, in order to optimize its power balance.

It should be understood that the term "optimize the power balance" is used to refer to minimizing the total power consumed by the rotary wing and the propulsive propellers of a rotorcraft of the hybrid helicopter type during fast and stabilized cruising flight.

Furthermore, in the meaning of the present invention, it should be understood that the term "motor-driven horizontal tailplane" also covers embodiments involving a stationary tailplane having one or more flap type motor-driven horizontal control surfaces that can be deflected.

It is clear that the present invention relates to aircraft having one or more propulsive propellers.

Various physical parameters are mentioned below, including the indicated air speed IAS, the velocity never exceed that should never be exceeded (VNE), U, which is the angular travel speed of the movable tailplane relative to the fuselage of the aircraft, and T, which is the duration for which it is activated.

The objects given to the invention are achieved by means of a method of controlling and regulating a rotorcraft presenting a high and stabilized speed of advance, the rotorcraft comprising at least one main lift rotor, at least one variable-pitch propulsion propeller, and at least one power plant for driving the main rotor(s) and at least one propeller, said method consisting in using a first loop for regulation in pitching or longitudinal attitude by means of a longitudinal cyclic pitch control for the blades of the main rotor(s), and a second loop for speed regulation by means of a mean pitch control of the blades of the propulsion propeller(s), wherein the method further consists in controlling the deflection angle of a horizontal tailplane by using a third loop for controlling and regulating said deflection angle of the horizontal tailplane to minimize the total power consumed by the main rotor and by the propulsive propeller(s) for a given speed of advance and attitude.

The control and regulation method thus enables the tailplane of a hybrid aircraft to be controlled so as to vary and optimize the proportions of power shared between the rotor and the propulsive propellers, for a given equilibrium point of the aircraft in terms of speed and attitude. The equilibrium point is ensured by the first loop for regulating longitudinal attitude or pitching by means of a longitudinal cyclic pitch control, and by the second loop by regulating speed by means of a mean pitch control of the propulsive propeller(s).

In an implementation in accordance with the invention, the method consists in sharing the total power consumed between the main rotor and the propulsive propeller(s) by acting on the corresponding pitch control by means of the adjustment of the deflection angle of the horizontal tailplane.

In an implementation in accordance with the invention, the method consists in activating the loop for controlling and regulating the deflection angle of the tailplane only if:

the roll angle is less than 10°;

the indicated air speed IAS is greater than 100 knots (kts); and no pilot action is detected on the control axes of the aircraft.

In an implementation in accordance with the invention, the method is based on a minimization algorithm that consists in:

a) determining the current power Pe delivered by the power plant after activating the control and regulation loop;

b) storing the delivered current power Pe;

c) controlling a first travel speed $U=\theta+$ for the motor-driven tailplane during a duration T;

d) then determining and storing the new current power Pe';

e) in comparing Pe' with Pe;

f) if Pe'≥P, controlling a second travel speed $U=\theta-$ for the motor-driven tailplane for a duration T+½T, where $\theta-$ is a speed opposite to the first speed $U=\theta+$, else in returning to step b);

g) at the end of the duration T+½T, determining and storing the new current power Pe";

h) comparing Pe" with Pe'; and i) if Pe"≥Pe', controlling a zero travel speed U for the motor-driven tailplane, else returning to step b).

In an implementation of the invention, the method consists in monitoring the control margin for the longitudinal cyclic pitch of the blades of the main rotor(s) and in inhibiting motor drive to the tailplane when said margin is below a determined threshold, e.g. equal to 10%.

Under extreme circumstances, the pilot might have the control stick in abutment in the nose-down position even though the attitude of the aircraft is level or even positive.

Under such circumstances, the pilot has no control margin. The solution thus consists in monitoring the control margin of the longitudinal cyclic pitch and in inhibiting motor drive to the tailplane when this margin is below the determined threshold. In an opposite extreme configuration, the rotor goes to a mode of operation in autorotation and the rearward flapping of the blades of the rotor becomes greater and greater with an accompanying risk of mechanical breakage.

In an implementation of the method in accordance with the invention, one solution consists, with the main rotor in autogyro mode, in inhibiting motor drive to the tailplane for positive movement (leading edge of the tailplane moving upwards) when a minimum threshold for the current power of the main rotor is reached, and continuing to do so so long as the maximum constraint on the mast moment is not exceeded. That would lead to accentuated fatigue of the mast and of the rotor hub. The control and regulation method in accordance with the invention thus optimizes the distribution of power consumption between the propulsive propellers and the main rotor while ensuring that a flapping limit or a control margin limit for the longitudinal cyclic pitch is not reached.

In an implementation in accordance with the invention, the method consists, in an autorotation mode of operation, in orienting the tailplane positively (leading edge of the tailplane high) into an extreme position in order to enhance the autogyro type configuration of the aircraft.

This configuration makes it easier to achieve autorotation since it maintains the main rotor under negative power. The main rotor tilts rearwards and thus facilitates passage to autorotation, should that become necessary.

The objects given to the invention are also achieved by means of a control and regulation system for implementing the rotorcraft control and regulation method, said rotorcraft including at least one main lift rotor, at least one variable pitch propulsive propeller, and at least one power plant for driving the main rotor(s) and the propeller(s), said system comprising:
  means for implementing the first loop for regulating longitudinal attitude or pitch by means of a longitudinal cyclic control of the cyclic pitch of the blades of the main rotor(s); and
  means for implementing the second loop for regulating speed by means of a mean pitch control of the propulsive propeller(s);
  wherein the system further comprises:
  means for activating and deactivating the third loop for controlling and regulating the deflection angle of the motor-driven horizontal tailplane;
  a computer for determining the deflection angle position of the motor-driven horizontal tailplane;
  at least one actuator controlled by the computer and driving pivoting of the motor-driven horizontal tailplane; and
  at least one sensor for verifying the deflection angle position.

In an embodiment, the control and regulation system includes means for acting in real time to determine the mast moment and the power consumed by the main rotor.

The objects given to the invention are also achieved by means of an autopilot system for a rotorcraft having at least one main lift rotor, at least one variable pitch propulsive propeller, and at least one power plant for driving the main rotor(s) and the propeller(s), wherein the system includes a control and regulation system as described above.

The objects assigned to the invention are also achieved by means of a rotorcraft control program for implementing the control and regulation method in accordance with the invention, wherein the program comprises code stored on a medium such as a memory or embodied by a signal, the code being readable and/or executable by at least one data processor unit such as an on-board processor or a processor suitable for being mounted on board a rotorcraft, in order to control and/or adjust the deflection angle of a motor-driven horizontal tailplane, the code comprising segments of code respectively for implementing the characteristic operation or steps of the control and regulation method.

The objects assigned to the invention are also achieved with the help of a rotorcraft type aircraft that includes a control and regulation system as described above.

The control and regulation method in accordance with the invention presents the advantage of optimizing the power consumed by the aircraft for given speed of advance and attitude.

The control and regulation method in accordance with the invention also presents the advantage of increasing the range the aircraft can travel. Thus, in order to optimize the range, it suffices to set a level attitude setpoint, to set an indicated air speed (IAS) equal to the most economic cruising speed, and to implement the relationship for managing the angular position of the tailplane in accordance with the invention. In the same manner, e.g. when climbing with a shallow slope, it suffices to have an attitude setpoint equal to the slope of the climbing flight path and to have a climb rate that is a function of said slope and said setpoint IAS, and then to implement the relationship for managing the angular position of the tailplane in order to optimize the distance that can be traveled during the climbing stage.

In addition, the control and regulation method in accordance with the invention presents the advantage of influencing the stability of the aircraft, since using the main rotor in propulsion mode provides the aircraft with better stability.

The control and regulation method in accordance with the invention also presents the advantage of facilitating autorotation maneuvers.

Furthermore, the invention makes it possible to comply with the control range for the longitudinal cyclic pitch and for the collective pitch of the pitch of the blades of the main rotor by inhibiting motor drive to the tailplane as soon as the nose-down margin drops below a predefined threshold (rotor in propulsion mode) or as soon as the collective pitch drops below a predefined threshold (rotor in autogyro mode).

BRIEF DESCRIPTION OF THE DRAWINGS

Other aspects, characteristics, and advantages of the invention appear in the following description of embodiments given by way of illustration with reference to the accompanying figures, in which.

DETAILED DESCRIPTION OF THE PREFERRED EMBODIMENT

In the meaning of the present application, the term "hybrid helicopter" designates a rotorcraft fitted with at least one propeller type thruster, with regulation adapted both to the operation of the lift and possibility also propulsion rotor(s) and also to the operation of the propeller(s).

Unless indicated explicitly or implicitly to the contrary, the terms "rotor" or "main rotor" designate a rotary wing of the rotorcraft.

Unless indicated explicitly or implicitly to the contrary, elements that are structurally and functionally identical and present in more than one of the figures are given the same numerical or alphanumerical references in each of them.

Figure 1:
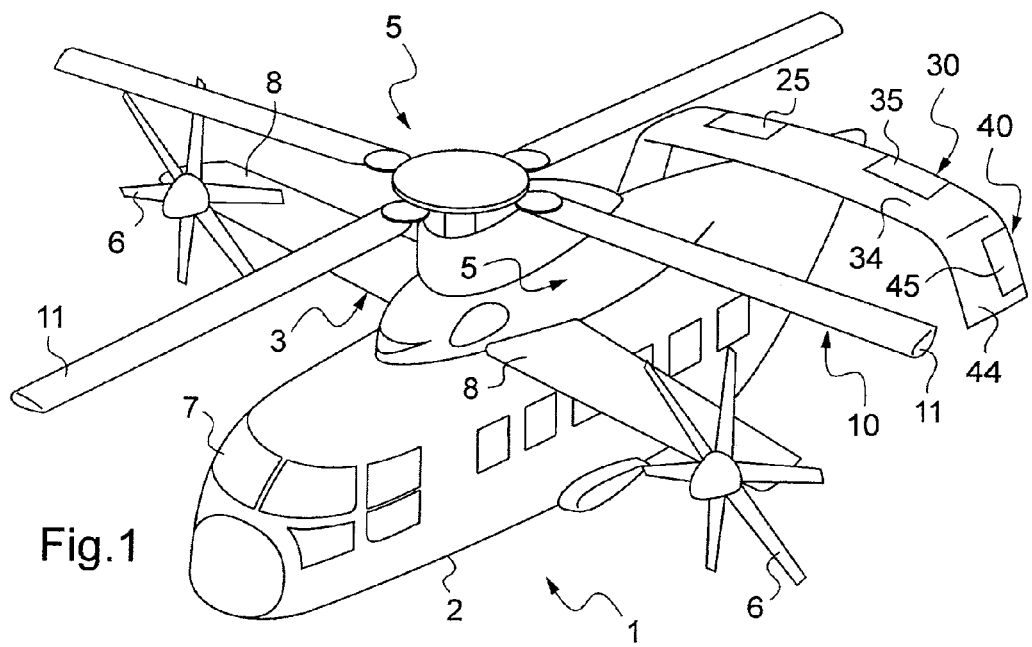
FIG. 1 is a perspective view of an embodiment of a hybrid helicopter in accordance with the invention.

With reference to FIG. 1, in particular, the hybrid helicopter 1 comprises a fuselage 2 with a cockpit 7 provided at the front thereof, a main rotor 10 for driving blades 11 in rotation under drive from two turbine engines 5 located on top of the fuselage 2 (not shown in FIG. 1 because of the presence of fairings), and on either side of the longitudinal plane of symmetry of the aircraft, and passing via a first main gearbox (MGB) not shown in FIG. 1.

Furthermore, the hybrid helicopter 1 is provided with a high wing 3 made up of two half-wings 8 disposed on top of the fuselage 2, these half-wings 8 being of substantially rectangular plane shape and presenting a negative dihedral angle.

The hybrid helicopter 1 is propelled by two propulsive propellers 6 driven by the two turbine engines 5, one of the propulsive propellers 6 being located at each of the ends of the wing 3.

Furthermore, at the vicinity of the tail end of the fuselage 2, there are provided stabilization and control surfaces for providing elevator control, namely a horizontal tailplane 30 with two control surfaces 25 and 35 that are movable relative to a front portion 34, and for providing steering control for two appropriate tail fins 40, each located at a respective end of the horizontal tailplane 30.

Advantageously, the tail fins 40, which are vertical or inclined relative to the vertical, may be constituted by respective stationary fronts 44 (fins proper) having respective movable portions behind them constituting rudders 45 for yaw control.

Specifically, the horizontal tailplane 30 and the cylindrical tail fins 40 form an upside-down U-shape on the top of the fuselage 2.

Furthermore, the hybrid helicopter 1 is fitted with an integrated drive train (not shown in FIG. 1) that, in addition to the two turbine engines 5, the rotor 10, and the two propellers 6, further comprises a mechanical interconnection system (not shown in FIG. 1) between those elements such that it should be understood that the rotor 10 and the propellers 6 rotate in planes that are orthogonal and not parallel.

With this configuration, the hybrid helicopter 1 is remarkable in that the speeds of rotation of the outlets of the turbine engines, of the propellers, of the rotor, and of the mechanical interconnection system are mutually proportional, with the proportionality ratios being constant regardless of the flight configuration of the hybrid helicopter in normal operating conditions of the integrated drive train.

Naturally, special devices lying outside the ambit of the invention are activated in the event of possible mechanical breakdowns.

The speed of rotation setpoint may be considered as a constant for conventional helicopters or for aircraft in accordance with the invention. Nevertheless, methods that are themselves known exist for calculating and/or determining the speed of rotation setpoint for the propulsive propellers 6. In certain applications, at constant aircraft speed, the speed of rotation setpoint varies as a function of atmospheric conditions, such as altitude and temperature.

In the embodiment described below, in particular with reference to FIGS. 2a and 2b, the stationary tailplane 30 and the control surface 25 and 35 are advantageously replaced by a horizontal tailplane 30 that is motor-driven as a whole, and that is located on a respective side of the aircraft together with a respective vertical fin portion 40a.

Figure 2A:
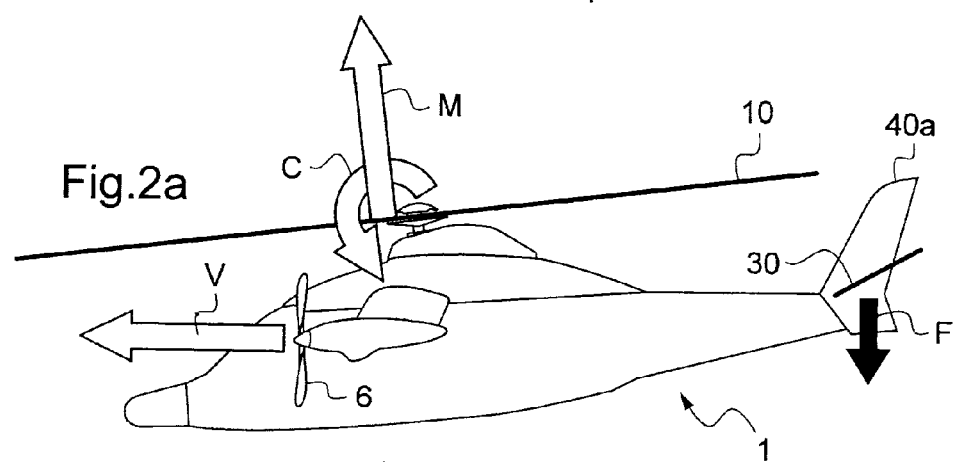
FIG. 2a is a diagrammatic profile view of an embodiment of a hybrid helicopter of the invention including a movable tailplane deflected into a given angular position.

FIG. 2a is a diagrammatic profile view of an embodiment of a hybrid helicopter 1 of the invention, including a movable horizontal tailplane 30 that is deflected into a first angular position.

Figure 2B:
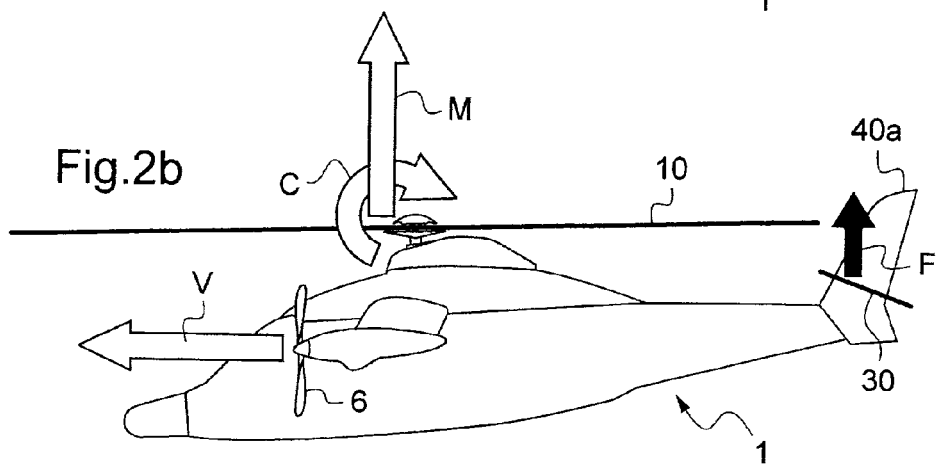
FIG. 2b is a diagrammatic profile view of an embodiment of a hybrid helicopter of the invention having a movable tailplane deflected in another angular position.

FIG. 2b is a diagrammatic profile view of an embodiment of a hybrid helicopter 1 of the invention including a movable tailplane 30 that is deflected into a second angular position.

The first and second angular positions of the tailplane are shown in different flight configurations.

Arrows M, C, V, and F correspond respectively to the lift of the main rotor, to the longitudinal nose-up or nose-down moment of the main rotor, to the propulsion force generated by the propulsive propellers 6, and to the resultant force exerted on the tail of the aircraft or the lift force of the tailplane.

By way of example, the invention provides a control and regulation system for implementing a control and regulation method for a rotorcraft. The system comprises means for implementing a first loop for regulating pitching or longitudinal attitude by means of a longitudinal cyclic control, and means for implementing a second loop for regulating speed via control of the mean pitch of the propulsion propeller(s) 6.

The control and regulation system also comprises means for activating and deactivating a third loop for controlling and regulating the deflection angle of the motor-driven horizontal tailplane 30 and a computer for determining the angular deflection position of the motor-driven horizontal tailplane 30.

At least one electrical actuator, driven by the computer, drives the motor-driven horizontal tailplane 30 in pivoting.

By way of example, the angle of the tailplane 30 is controlled by using at least one sensor that measures the angular deflection position of said tailplane 30.

The control and regulation system may also include means for operating in real time to determine the mast moment M and the power consumed by the main rotor.

The control and regulation system advantageously forms a part of an autopilot system for a rotorcraft.

Figure 3:
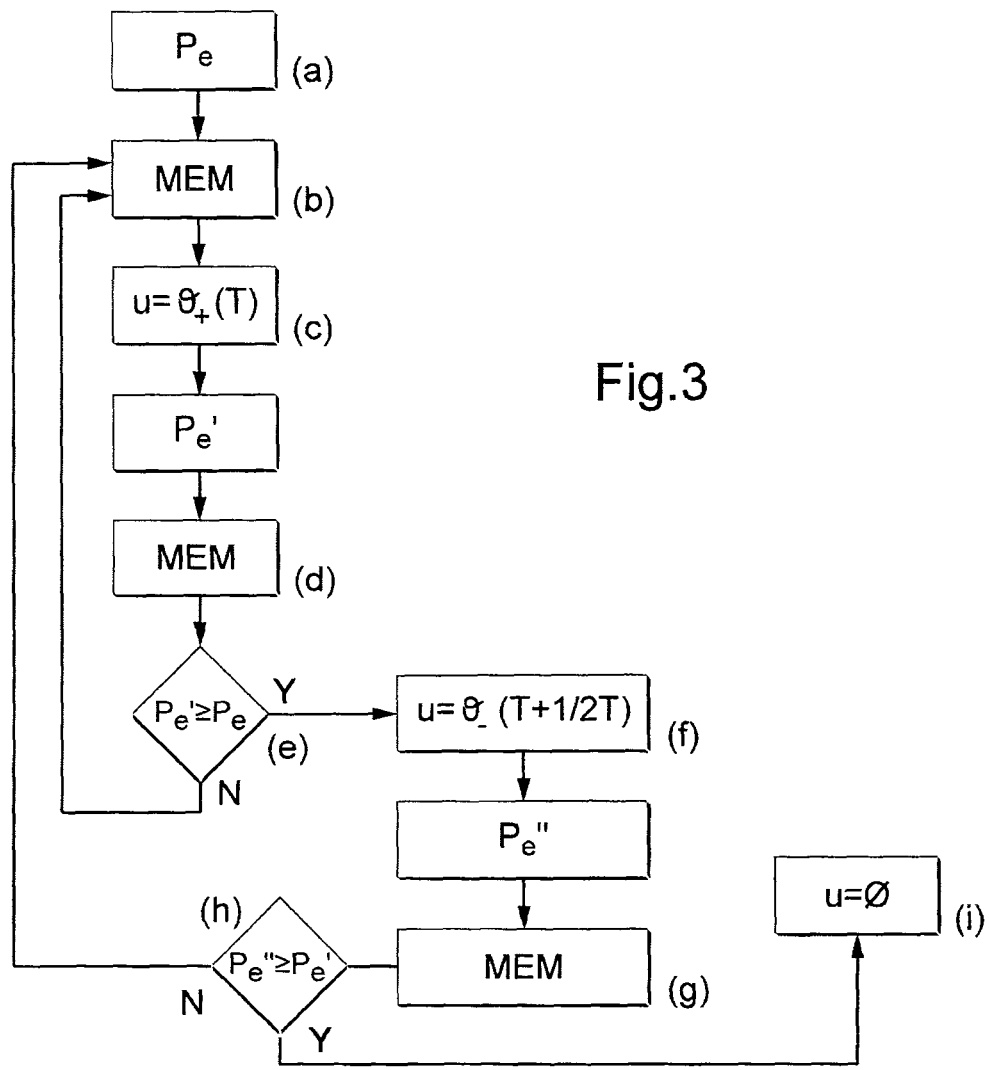
FIG. 3 is a flow chart showing an implementation of a loop for controlling the deflection angle of a motor-driven tailplane as a function of a consumed power balance, in the ambit of a control method in accordance with the invention.

FIG. 3 is a flow chart of an example implementation of a loop for controlling the deflection angle of a motor-driven tailplane 30 as a function of a consumed power balance in the context of a control method in accordance with the invention.

The control and regulation method thus relates to a rotorcraft at a high and stabilized speed, the rotorcraft having at least one main lift rotor, at least one variable-pitch propulsive propeller 6, and at least one power plant for driving the main rotor(s) and the at least one propeller 6. The method consists in using a first loop for regulation in pitching or longitudinal attitude by means of a longitudinal cyclic pitch control of the blades of the main rotor, and a second loop for regulating speed by means of a mean pitch control for the propulsive propeller(s) 6.

The method in accordance with the invention also consists in controlling the deflection angle of a horizontal tailplane 30 by using a third loop for controlling and regulating said deflection angle of the horizontal tailplane 30 in order to minimize the total power consumed by the main rotor and by the propulsive propeller(s) 6, for a given speed of advance and attitude of the rotorcraft.

In an example implementation, the method consists in sharing the total power consumed between the main rotor 10 and the propulsive propeller(s) 6 by acting on the corresponding pitch controls by regulating the deflection angle of the horizontal tailplane 30.

In an implementation, the conditions for activating the loop for controlling and regulating the deflection angle of the tailplane 30 are as follows:

the roll angle is less than 10°;

the indicated air speed IAS is greater than 100 kts; and no pilot action is detected on the control axes of the aircraft.

In an implementation, the method is based on a minimization algorithm that consists in:

in a step a), in determining the current power Pe delivered by the power plant after activating the control and regulation loop;

in a step b), in storing the delivered current power Pe;

in a step c), in controlling a first travel speed U=θ+ for the motor-driven tailplane 30 for a duration T, where θ+ is a speed of upward travel for the leading edge of the tailplane 30;

in a step d), in then determining and storing the new current power Pe';

in a step e), in comparing Pe' with Pe;

in a step f), if Pe'≥P, in controlling a second travel speed U=θ− for the motor-driven tailplane for a duration T+½T, where θ− is a speed opposite to the first speed U=θ+, else in returning to step b);

in a step g), at the end of the duration T+½T, in determining and storing the new current power Pe";

in a step h), in comparing Pe" with Pe'; and in a step i), if Pe"≥Pe', in controlling a zero travel speed U for the motor-driven tailplane, else returning to step b).

By way of example, the speeds U are angular speeds equal to 0.1 degrees per second (°/s) and the duration T is equal to 10 seconds (s), for example.

In an implementation, the method in accordance with the invention consists in monitoring the control margin of the longitudinal cyclic pitch of the blades of the main rotor and inhibiting the motor drive to the tailplane 30 when said margin is less than a determined threshold.

In an implementation, and with the main rotor in an autorotation mode of operation during the autogyro mode of operation of the aircraft, the method in accordance with the invention consists in inhibiting, the motor drive to the tailplane 30 in a positive direction (front high) when a minimum threshold is reached for the current power of the main rotor, and continuing to do so so long as the constraint of the maximum mast M moment is not exceeded, which could give rise to accentuated fatigue of the mast and of the rotor hub.

In an implementation, and in an autogyro mode of operation of the aircraft during which the main rotor is in autorotation, the method in accordance with the invention consists in orienting the tailplane 30 positively (front high) into an extreme position in order to enhance the autorotation type configuration of the main rotor 10.

The present invention also provides a rotorcraft control program for implementing the control and regulation method. The program comprises code stored on a medium such as a memory or embodied by a signal, the code being readable and/or executable by means of a data processor unit such as a processor that is on board or suitable for being put on board a rotorcraft, in order to control and/or regulate the adjustment of the deflection angle of a motor-driven horizontal tailplane, the code comprising code segments respectively for implementing the characteristic operations or steps of said control and regulation method.

Thus, for a hybrid configuration aircraft, a motor-driven tailplane 30 has the same advantages as for a conventional helicopter, i.e. reducing the "attitude hump" and limiting the nose-down attitude in forward flight. The use of a motor-driven tailplane 30 at high forward speed of the aircraft is very different.

A hybrid aircraft can fly with a level attitude since the main rotor serves essentially to provide the aircraft with lift. A tailplane at a negative angle (leading edge of the tailplane down) generates a nose-up moment on the aircraft. To remain at a level attitude, that then requires the cyclic control to take on a nose-down position in order to use the main rotor 10 to oppose the action of the tailplane 30. The main rotor is then in propulsive mode, with a component of its lift being used to propel the aircraft. As a result, the power consumed by the main rotor 10 is high. This configuration example is shown in FIG. 2a.

In a converse situation, a tailplane 30 that is at a positive angle (leading edge of the tailplane high), generates a moment causing a nose-down attitude of the aircraft. To remain with a level attitude, it is necessary for the cyclic control to request a nose-up attitude. The main rotor 10 then passes to autogyro mode, its thrust serving solely to provide the aircraft with lift so its power consumption is lower or even zero or negative. This configuration example is shown in FIG. 2b.

Furthermore, in order to remain at constant speed, the propulsive propellers 6 need to compensate the variations perceived in terms of propulsion from the main rotor 10. If the main rotor 10 is in a propulsive mode, then it contributes to propelling the aircraft while degrading its lift-to-drag ratio. The propellers 6 can then be off-loaded in order to conserve the same speed of advance for the aircraft. This also improves the propulsive efficiency of the propellers 6. The pitch of the propellers 6 can be decreased, as can the power they consume.

Thus, at constant speed of advance and with a modification to the deflection angle of the tailplane 30, if the power consumed by the main rotor 10 increases, the power consumed by the propellers 6 decreases.

Similar reasoning applies conversely when the aircraft is in autogyro mode. If the power consumed by the main rotor 10 decreases while conserving the same forward speed, then the pitch of the propellers 6 needs to increase as does their power consumption. In autogyro mode, the lift-to-drag ratio of the main rotor 10 is improved, but the propulsive efficiency of the propellers 6 degrades.

The motor drive imparted to the tailplane 30 thus makes it possible to adjust the way power is shared between the main rotor 10 and the propellers 6, while retaining a level attitude and a constant speed. The stresses on the mechanical parts of the main rotor 10 differ substantially from the stresses that exist in a conventional helicopter. The positioning of the tailplane by means of the method in accordance with the invention thus makes it possible to achieve minimum power consumption at given attitude. The performance criterion and the reduction in fuel consumption are significantly improved by the method and the systems in accordance with the invention.

Control of the tailplane 30 thus constitutes a third regulation loop acting on the equilibrium of the aircraft in pitching and in propulsion. Series actuators and parallel actuators serve firstly to stabilize the aircraft on the pitching axis and on the propulsion axis of the aircraft. Once attitude is stabilized and speed is maintained, additional regulation is applied to act on the position of the tailplane 30. The angle of the tailplane 30 is then modified to find a position for minimum power consumption while conserving the speed and the attitude of the aircraft. This is made possible by sharing the consumption of power between the main rotor and the propellers 6 and by their respective efficiencies at given speed of advance.

The method in accordance with the invention, and as described more particularly in an application having one main rotor 10 and two propulsion propellers 6, can be transposed without difficulty to a different application without thereby going beyond the ambit of the invention, e.g. to an application having a single propulsive propeller 6 and/or two main lift rotors 10.

On-board avionics systems include various measurement functions and/or calculation functions suitable for providing the flight parameter values that are used in the context of the present invention. These functions are themselves known and they are consequently not described.

Naturally, the present invention may be subjected to numerous variants as to its implementation. Although several embodiments and implementations are described, it will readily be understood that it is not conceivable exhaustively to identify all possible embodiments and implementations. It is naturally possible to envisage replacing any of the means described or any of the steps described by equivalent means or by an equivalent step, without thereby going beyond the ambit of the present invention.

What is claimed is:

1. A method of controlling and regulating a rotorcraft presenting a high and stabilized speed of advance, the rotorcraft comprising at least one main lift rotor, at least one variable pitch propulsion propeller, and at least one power plant for driving the main rotor(s), said method including using a first loop for regulation in pitching or longitudinal attitude by means of a longitudinal cyclic pitch control (C) for the blades of the main rotor(s), and a second loop for speed regulation by means of a mean pitch control of the blades of the propulsion propeller(s), wherein the method further includes controlling the deflection angle of a horizontal tailplane by using a third loop for controlling and regulating said deflection angle of the horizontal tailplane to minimize the total power consumed by the main rotor and by the propulsive propeller(s) for a given speed of advance and attitude.

2. A control and regulation method according to claim 1, further comprising sharing the total power consumed between the main rotor and the propulsive propeller(s) by acting on the corresponding pitch control by means of the adjustment of the deflection angle of the horizontal tailplane.

3. A control and regulation method according to claim 1, further comprising activating the loop for controlling and regulating the deflection angle of the tailplane only if:
   the roll angle is less than 10°;
   the indicated air speed IAS is greater than 100 kts; and
   no pilot action is detected on the control axes of the aircraft.

4. A control and regulation method according to claim 3, further comprising:
   a) determining the current power Pe delivered by the power plant after activating the control and regulation loop;
   b) storing the delivered current power Pe;
   c) controlling a first travel speed $U=\theta+$ for the motor-driven tailplane during a duration T;
   d) then determining and storing the new current power Pe';
   e) in comparing Pe' with Pe;
   f) if Pe'≥P, controlling a second travel speed $U=\theta-$ for the motor-driven tailplane (30, 25, 35) for a duration T+½T, where $\theta-$ is a speed opposite to the first speed $U=\theta+$, else in returning to step b);
   g) at the end of the duration T+½T, determining and storing the new current power Pe";
   h) comparing Pe" with Pe'; and
   i) if Pe"≥Pe', controlling a zero travel speed U for the motor-driven tailplane, else returning to step b).

5. A control and regulation method according to claim 1, further comprising monitoring the control margin for the longitudinal cyclic pitch of the blades of the main rotor(s) and in inhibiting motor drive to the tailplane when said margin is below a determined threshold.

6. A control and regulation method according to claim 1, further comprising, with the main rotor in an autorotation mode of operation, inhibiting motor drive to the tailplane for positive movement (front upwards) when a minimum threshold for the current power of the main rotor is reached, and continuing to do so so long as the maximum constraint on the mast moment (M) is not exceeded.

7. A control and regulation method according to claim 1, further comprising, in an autorotation mode of operation, orienting the tailplane positively (front upwards) to an extreme position in order to enhance the autogyro type configuration of the rotorcraft.

8. A control and regulation system for implementing the rotorcraft control and regulation method according to claim 1, said rotorcraft including at least one main lift rotor, at least one variable pitch propulsive propeller, and at least one power plant for driving the main rotor(s) and the propeller(s), said system also comprising:
   means for implementing the first loop for regulating longitudinal attitude or pitch by means of a longitudinal cyclic control of the pitch of the blades of the main rotor(s); and
   means for implementing the second loop for regulating speed by means of a mean pitch control of the blades of the propulsive propeller(s);
   wherein the system further comprises:
      means for activating and deactivating the third loop for controlling and regulating the deflection angle of the motor-driven horizontal tailplane;
      a computer for determining at least the deflection angle position of the motor-driven horizontal tailplane;
      at least one actuator controlled by the computer and driving pivoting of the motor-driven horizontal tailplane; and
      at least one sensor for verifying the deflection angle position.

9. A control and regulation system according to claim 8, further including means for acting in real time to determine the mast moment (M) and the power consumed by the main rotor.

10. An autopilot system for a rotorcraft having at least one main lift rotor, at least one variable pitch propulsive propeller, and at least one power plant for driving the main rotor(s) and the propeller(s), wherein the system includes a control and regulation system in accordance with claim 8.

11. A rotorcraft control program for implementing the control and regulation method according to claim 1, wherein the program comprises code stored on a medium such as a memory or embodied by a signal, the code being readable and/or executable by at least one data processor unit such as an on-board processor or a processor suitable for being mounted on board a rotorcraft, in order to control and/or adjust the deflection angle of a motor-driven horizontal tailplane, the code comprising segments of code respectively for implementing the characteristic operation or steps of the control and regulation method.

12. An aircraft of the rotorcraft type, including a control and regulation system according to claim 8.

* * * * *